May 6, 1924.
F. A. RAY
GAS TRAP FOR OIL TANKS AND THE LIKE
Filed Feb. 19, 1923
1,492,579
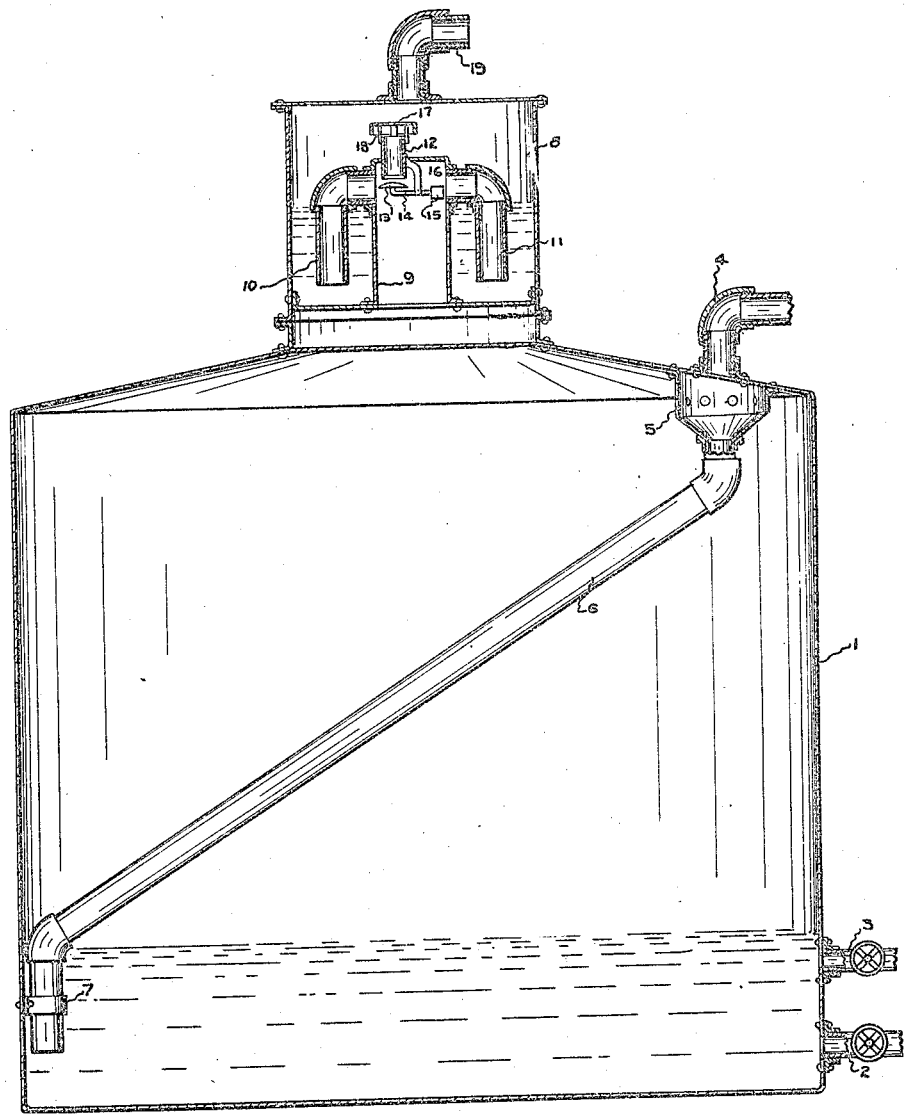

Patented May 6, 1924.

1,492,579

UNITED STATES PATENT OFFICE.

FELBERT ASBURY RAY, OF WICHITA FALLS, TEXAS.

GAS TRAP FOR OIL TANKS AND THE LIKE.

Application filed February 19, 1923. Serial No. 620,077.

*To all whom it may concern:*

Be it known that I, FELBERT ASBURY RAY, a citizen of the United States, residing at Wichita Falls, in the county of Wichita and State of Texas, have invented a new and useful Gas Trap for Oil Tanks and the like, of which the following is a specification.

The invention relates to a gas trap for oil tanks and the like for the purpose of preventing evaporation of the oil.

Another object of the invention is to provide a device of this nature that will hold the specific gravity of the oil.

Another object of the invention is to provide a gas trap having many advantages, and can be manufactured at a very nominal cost.

The nature and advantages of the invention will be better understood when the following detail description is read in connection with the accompanying drawing forming a part of this application, the invention residing in the construction, combination and arrangement of parts as claimed.

In the accompanying drawing the various parts will be referred to by numbers. And, whereas, 1 is an oil tank of any suitable design, having the usual outlets arranged thereon, as illustrated at 2 and 3. 4 is the usual inlet. 5 is a housing arranged inside of the tank, having a certain number of holes arranged therein, as shown. 6 is a pipe attached to the housing 5, as shown, and extending to the bracket 7 on the opposite side of the tank, thus providing a means of lowering the oil into the tank without agitation. 8 is an auxiliary tank attached to the tank 1, as shown. 9 is a pipe attached to the bottom of the tank 8. 10 and 11 are pipes attached to the pipe 9, as shown. 12 is a release valve for the purpose hereinafter described. The release valve 12 is provided with a half ball 13, supported by the arm 14 and balanced with the weight 15. The arm 14 is attached to the arm 16, as shown. 17 is a cap arranged over the release valve 12, supported on four standards, as illustrated at 18. 19 is a gas outlet arranged on the top of the tank 8.

The device operates in the following manner: The oil coming into the tank through the inlet 4, through the housing 5, and is lowered into the tank 1 through the pipe 6. Any gas that accumulates in the pipe 6 escapes into the tank 1 through the holes in the housing 5. The gas evaporating from the oil, passes through the pipe 9 in the tank 8. The pressure created in the pipe 9 closes the release valve 12. The weight 15 on the arm 14 is arranged to keep the vacuum release valve 12 in a closed position except when the valves 2 and 3 are opened as hereinafter described. The pressure accumulating in the pipe 9 forces the gas into the pipes 10 and 11. When the pressure is sufficient, the gas will pass from the pipes 10 and 11 into the oil in the tank 8. A certain amount of the gas passing through the oil will return to a liquid form. The gas that does not return to a liquid form will escape through the outlet 19. When either of the valves 2 or 3 are open, the suction created by the oil passing out of the tank 1 will open the release valve 12.

While it is believed from the foregoing description the nature and advantages of the invention will be readily apparent, I desire to have it understood that I do not limit myself to what is herein shown and described, and that such changes may be resorted to, when desired, as fall within the scope of what is herein claimed.

What I claim is:

1. A tank mounted upon a storage tank, the first mentioned tank having fluid therein, a centrally disposed tubular member having an opening in said storage tank, the upper end of said tubular member being closed, a plurality of tubular members extending downward from the upper portion of said first mentioned tubular member having outlets in the fluid of said first mentioned tank.

2. A storage tank having an inlet therein at the top thereof, a perforated housing disposed at said storage tank at said inlet, a tubular member extending downward from said perforated housing, a small tank containing fluid mounted upon said storage tank, a tubular member having an opening in said storage tank, the upper end of said tubular member being closed, a plurality of tubular members attached to said first mentioned tubular member having outlets in the fluid of said small tank.

3. A gas trap as defined in claim 2, having a vacuum release valve disposed in the top of said tubular member in said small tank.

4. A gas trap as defined in claim 2, said vacuum release valve comprising a tubular member disposed in the top of the tubular member in said small tank, a perforated cover disposed at the top of the first mentioned tubular member, a pivoted arm, a valve seat disposed on said pivoted arm having association with the first mentioned tubular member, an adjustable weight on said pivoted arm.

FELBERT ASBURY RAY.

Witnesses:
C. B. TONEY, Jr.,
FRED. L. BRONSON.